United States Patent Office 3,054,642
Patented Sept. 18, 1962

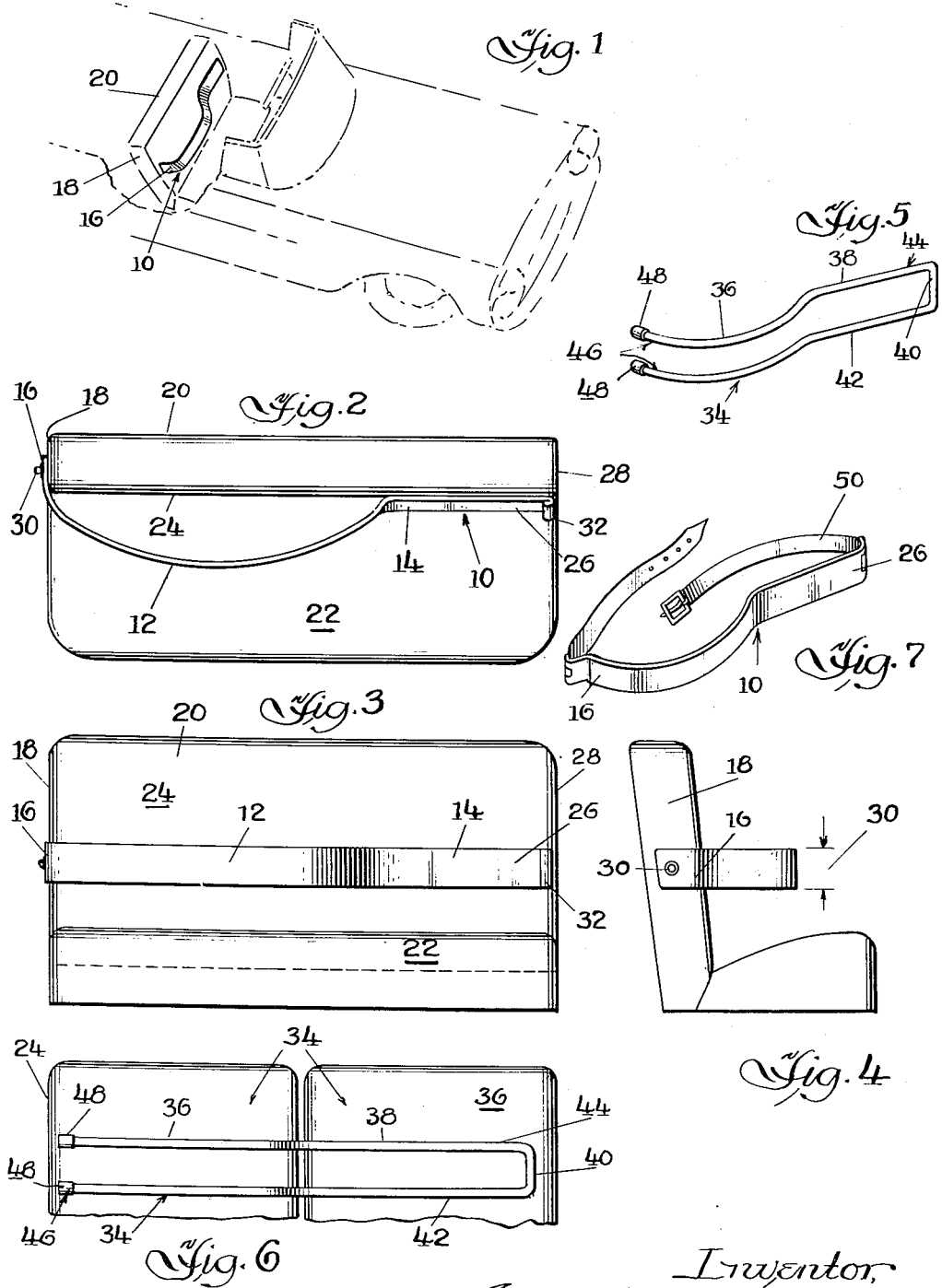

3,054,642
CHILD RESTRAINER FOR VEHICLES
James P. Bonfield, R.R. 1, Batavia, Ill.
Filed Dec. 19, 1960, Ser. No. 76,809
5 Claims. (Cl. 297—390)

This invention pertains to the art of protecting lives and preventing injuries to children of tender years that generally accompany a parent or guardian while they are operating an automobile. More particularly it is directed to a device to restrain the fall of a child and still permit unrestrained though typical movement of the child, its body and limbs while a passenger in an automobile.

Though there are a number of devices that are in current vogue and adapted to protect the child, yet they all restrain to some degree freedom of movement of the child. Safety belts fastened to the back of the seat, are generally placed about the hip portion of a child or of the adult and restrain his movement. A child particularly is a bundle of energy constantly wiggling, squirming and moving and consequently in the course of time becomes free of the safety belt or becomes so enmeshed and trapped that it sets up a howl of disgust that distracts the driver of the vehicle and requires generally immediate attention.

Childrens' car seats hung over the back rest cushion are also practical particularly for infants. However an active child of tender years soon tires of this restraint, attempts to stand up, crawl out or otherwise causes difficulties for the driver. Any parent, particularly a mother, who is intent on watching the road conditions and traffic pattern, under such conditions may become completely upset or even hysterical if she senses that her child may be about to fall out or who sets up a howl of dismay or irritation to drive one to distraction. Obviously she may cause an accident with possible injury to herself and the child or to others besides dented fenders and property damage.

It therefore is an object of my invention to provide a simple, inexpensive one piece construction kiddie keeper or child retainer for use in an automobile.

A further object of my invention is to provide a construction suitable for retaining a child in position on the cushion of an automobile seat adjacent the driver without restraining the movements of the child's limbs or body but still confining it to a particular position.

Another object of my invention is to provide a body restraining means to prevent injury to children or invalids, while riding an automobile alongside the driver, wherein the driver has control of the child or invalid.

A still another object of my invention is to provide a child restraining means which is readily adjustable vertically and adaptable to confine children of varying heights.

A still further but not final object of my invention is to provide in combination with an automobile seat, a means for retaining a person within a certain position without restraining motion of the person's body or limbs.

A further object of my invention is to provide a child restraining means that can be used singly or in number to provide an enclosure within the automobile from which the child cannot crawl out either over or under.

These and other objects, adaptations, variations and modifications will be readily apparent to one skilled in this art particularly in view of the clear and definitive description given hereinbelow of the fundamental concepts underlying this invention of which the preferred embodiment is further illustrated in the annexed drawing forming a part of this disclosure.

In the annexed drawing certain numerical characters are employed to identify certain elements thereon and for convenience these same characters are used hereinbelow for reference and conciseness.

In the drawings:

FIGURE 1 is a partial view in perspective of the invention as used in combination with an automobile.

FIGURE 2 is plan view of the device as attached to an automobile seat.

FIGURE 3 is an elevational view, partly in section and broken away, of the embodiment shown in FIGURE 2.

FIGURE 4 is an end view of the device shown in FIGURE 3.

FIGURE 5 is a perspective view of a modification of my device shown as a tubular construction.

FIGURE 6 is a structure of FIGURE 5 as used in the automobile seat.

FIGURE 7 is a modification showing a strap arrangement for fastening the device to the back cushion of the automobile seat.

Essentially my invention comprises a longitudinal restraining member 10 extending substantially the length of the automobile seat. It may be made of plastic, plywood, glass laminate reenforced plastic sheeting, metal or other suitable material having sufficient strength and rigidity to restrain a person from falling in the event he should inadvertently lean against it or be thrown against it upon the sudden stopping of the automobile. The member 10 comprises essentially a curved portion 12, and linear portion 14 preferably formed integrally.

The child restraining member 10 as mentioned above is preferably formed integrally of a one piece construction. It is made rigidly but it certainly can have any amount of resiliency built therein depending on the type of material used and on the design. In the illustrated embodiment shown in FIGURES 1, 2, 3, 4 and 7 a wide band is shown while FIGURES 5 and 6 show a modification embodying a tubular construction. In addition, FIGURE 7 is directed to a flexible belt type which, if desired, can be fastened about the back rest section of the automobile seat.

In its simplest and unique form, the kiddie holder consists of one or more longitudinal members 10 as described hereinabove. To retain the body of the child on the seat adjacent the driver or of the adult accompanying the child, all that is required is to place the child on the seat adjacent to the driver or the accompanying adult, enclose the child within the curvilinear portion 12 of the restraining member 10. The outer edge or end 16 of said means 10 terminates about the edge or side 18 of the back rest portion 20 of the seat 22. The flat portion 14 thereof abuts against the back of the driver and the back rest face 24 of the cushion 20 of the seat 22. Thus by bearing on the flat portion 14, the driver or the accompanying adult retains the restraining member 10 against the back face 24 at any desired level to form between it and the member 10 an enclosure for the child who is protected from falling by the restraining means 10 in event the car should lurch or stop suddenly.

Though preferably the longitudinal member 10 is co-extensive in length with the back rest cushion 20, it can be so dimensioned that the end 16 adjacent the curved portion 12 will rest near the edge 18 on the face 24 of the said cushion 20. Likewise the other end 26 adjacent the said flat portion 14 and the driver (not shown) can also abut against the face 24 of the back rest cushion 20 near its edge or side 28 also.

Thus in its simplest form, the kiddie holder consists of a relatively stiff longitudinal member having a flat portion 14 generally substantially coextensive with the width of the driver's back and a curvilinear portion 12, substantially coextensive with the balance of the automobile seat not occupied by the driver. The kiddie holder can be placed at any vertical height above the level of the seat 22, and then retained in such position by the back of the driver (not shown) pressing it against the face 24 of the back rest cushion 20 of the seat. Thus the vertical height above the seat top 22 can be readily adjusted to accommodate babes of tender years, as well as growing tots and children.

Obviously, if the child is quite active, then two or more kiddie holders 10 may be used and mounted in parallelism with each other and with the seat 22.

Though the simplest form of my kiddie holder 10 has been described, hereinabove, there are several modifications that can be readily constructed. For instance, the end 16 of the kiddie holder 10 adjacent the edge or side 18 can be extended and formed to wrap around the corner of the said edge 18 and said back rest cushion 20. A frictional snap button 30 arrangement can be provided on the face of the edge 18 onto which the end 16 of the longitudinal member 10 can be attached and retained thereon frictionally. Likewise on the other end 26 of said holder 10, adjacent the driver's back portion, the end 26 may be inturned to form thereon a bead or inwardly directed curl 32 which will aid in the retention of the said end 26 by the driver's back.

FIGURES 5 and 6 illustrate another modification made of tubular construction preferably metallic, though plastic tubing or sturdy construction can also be used. A tube 34 has a curvilinear portion 36 substantially coextensive with the unoccupied length of the face 24 of the back rest cushion 20. Another integrally connected flat portion 38 is substantially coextensive with the driver's back portion of said face 24 of the back rest cushion 20. However, to retain it in position and prevent slippage this end 40 is reversely bent or formed 42 to provide therebetween substantially a parallelogram or rectangular structure 44 against which the driver's back can assert pressure and retain the tubular kiddie holder 34 in a position at the desired vertical height above the seat 22. The ends 46, if desired, can be covered with protective caps 46. These can be made of soft rubber, plastic or any desired material. A tubular structural embodiment 34 can be readily formed by continuous bending processes which are highly mechanized to produce a highly quality product at relatively low cost.

Another embodiment is shown in FIGURE 7. Essentially the kiddie holder 10 is quite similar fundamentally to that shown in its simplest form described above. However, in event it is necessary to leave the child alone in the automobile or momentarily relave the driver's back pressure, a means such as shown to retain the kiddie holder 10 in position is provided. One of such means is a belt arrangement 50 whereby a buckle 52 and a belt portion 54 are attached to the respective ends 26 and 16 of the longitudinal member 10. The belt arrangement 50 is placed to encompass the back rest portion 20, at the desired level above the seat 22 to accommodate the height of the child. Thus even if the child is left unattended he is restrained in his locomotion through he has the full use of his limbs and freedom of movement of his body.

My improved child restraining device is quite simple and inexpensive to produce but its principal feature is its ability to restrain the child and give him the sense that he has full freedom of movement.

Though the above embodiments of my invention are of the preferred type nevertheless it is possible to vary the same considerably without departing from the fundamental concepts of my invention as defined in the annexed claims forming a part of this disclosure.

I claim:

1. A body restraining unit in combination with an automobile seat comprising a rigid, longitudinal member extending substantially the width of the said automobile seat, a relatively flat portion adapted to be positioned between the driver's back and the back rest of said automobile seat and a curvilinear portion adjacent said flat portion spaced from said back rest and adapted therewith to enclose a pre-selected area between it and the said back rest.

2. In the combination of claim 1 wherein the end of the said curvilinear portion is adapted to contact said back rest.

3. In the combination of claim 1 wherein the said curvilinear portion has at least one end thereof adapted to abut against the back rest of said automobile seat and, the end section of the flat portion adjacent the back of the driver having thereon a detent adapted to be retained by the back rest cushion of said automobile seat and the driver's back pressure against the said back rest.

4. A child restraining means in combination with a back rest cushion of an automobile seat comprising a longitudinal member adapted to span substantially the length of the said automobile back rest cushion, the ends of said longitudinal member adapted to abut against the said back rest, an intermediate curvilinear portion spaced from said back rest to form therebetween an enclosure, as an integral part of said longitudinal member, and a fastening means on said longitudinal member adapted to engage the said back rest cushion.

5. A child restraining holder in combination with an automobile seat comprising a tubular frame substantially coextensive in length with breadth of said seat, the said tubular frame having a curvilinear portion spaced from the back rest cushion of said seat to form therebetween an enclosure a flat portion integrally joined to said curvilinear portion, the said flat portion comprising a reversely bent portion forming substantially an enclosed area adapted to be engaged by the back of the driver and the face of the said back rest cushion of the said automobile seat.

References Cited in the file of this patent

UNITED STATES PATENTS

| | | |
|---|---|---|
| 2,668,583 | Singer | Feb. 9, 1954 |
| 2,695,052 | Yates | Nov. 23, 1954 |
| 2,726,714 | McAndrews | Dec. 13, 1955 |